L. L. SCOTT.
RESILIENT APPARATUS FOR VEHICLES.
APPLICATION FILED SEPT. 29, 1913.

1,159,872.

Patented Nov. 9, 1915.
2 SHEETS—SHEET 1.

WITNESSES:

INVENTOR
Lewis L. Scott

L. L. SCOTT.
RESILIENT APPARATUS FOR VEHICLES.
APPLICATION FILED SEPT. 29, 1913.

1,159,872.

Patented Nov. 9, 1915.
2 SHEETS—SHEET 2.

WITNESSES:
E P Hickm Jr
A. W. Ehlert.

INVENTOR
Lewis L. Scott.

UNITED STATES PATENT OFFICE.

LEWIS L. SCOTT, OF ST. LOUIS, MISSOURI.

RESILIENT APPARATUS FOR VEHICLES.

1,159,872.  Specification of Letters Patent.  Patented Nov. 9, 1915.

Application filed September 29, 1913. Serial No. 792,427.

*To all whom it may concern:*

Be it known that I, LEWIS L. SCOTT, a citizen of the United States, residing at St. Louis, Missouri, have invented a certain new and useful Resilient Apparatus for Vehicles, of which the following is a specification.

Figure 1:
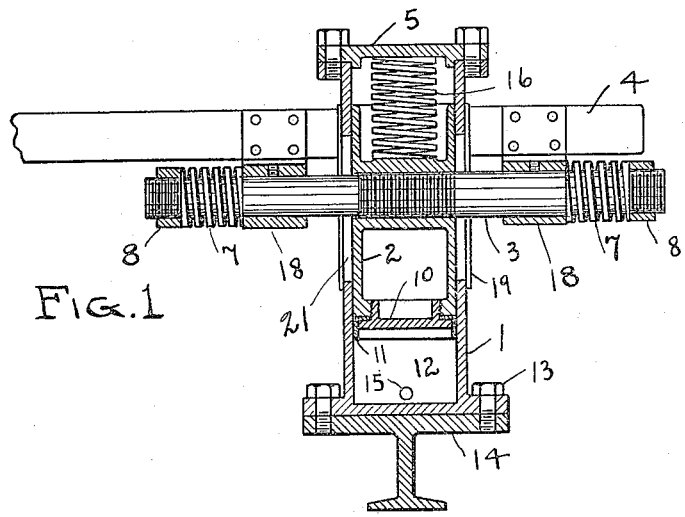
Figure 2:
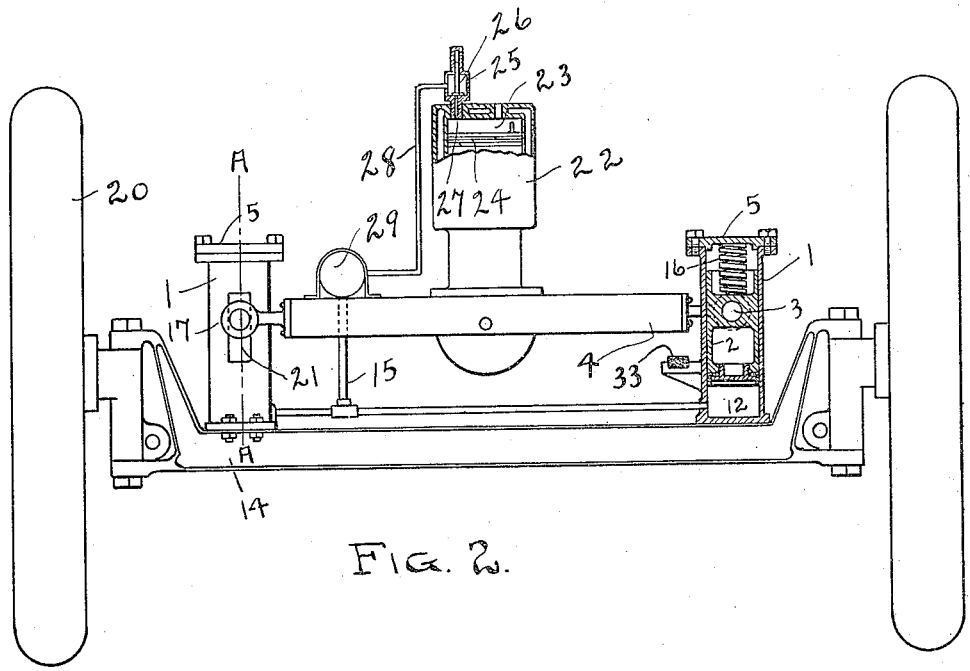
Figure 4:
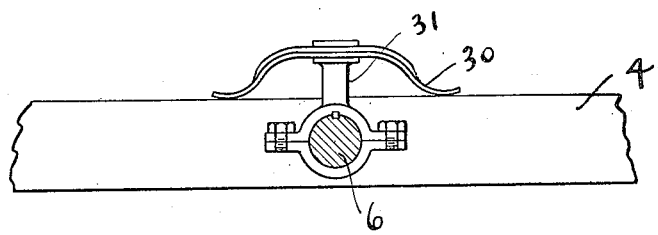
Figure 3:
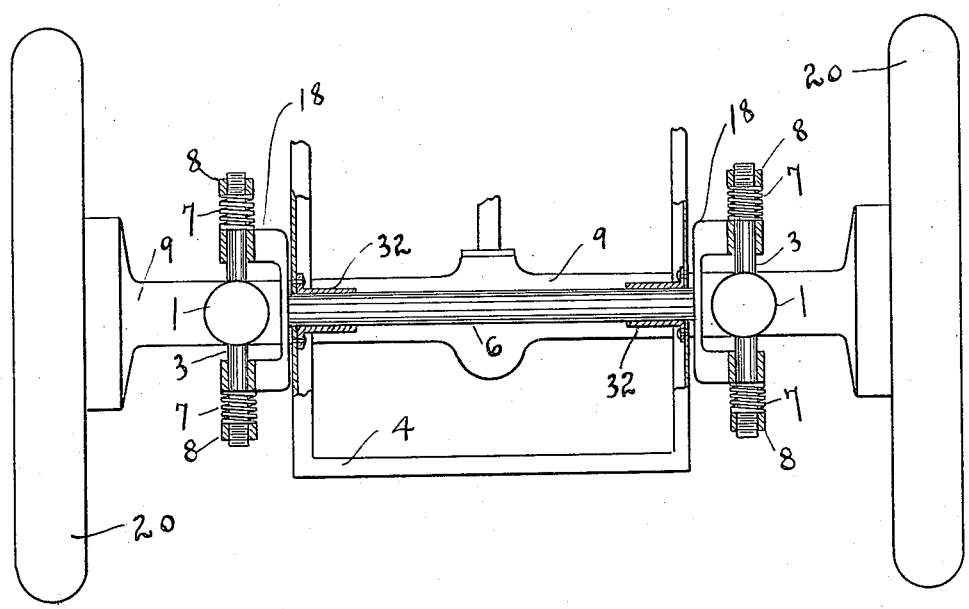

Figure 1 is a side view shown in vertical section, taken on the line A A of Fig. 2, of a resilient apparatus constructed in accordance with my invention. Fig. 2 shows the front view, partly in section, of my invention as applied to the front axle of a road vehicle. Fig. 3 is a plan view, partly in section, of my invention as applied to the rear axle of a road vehicle. Fig. 4 shows a means of limiting the oscillating movement of the shaft 6 shown in Fig. 3.

The object of this invention is to provide an apparatus that will allow the main frame, (and parts supported thereby), of a vehicle to be protected against shocks in a horizontal as well as a vertical direction; further to construct said apparatus so that it will adapt itself to all road conditions without undue strain on the vehicle frame, axles or the apparatus itself; further to provide an apparatus which supports and cushions the vehicle frame (and parts carried thereby), by means of compressed air, which is not subject to punctures etc. as is the case with the pneumatic tire commonly used on automobiles.

In the drawings, 1 indicates a cylinder, and 2 a piston contained therein, 3 is a piston pin rigidly secured to said piston 2, and rotatably mounted in the bearings 18; said bearings 18 may be rigidly secured to the frame 4 or they may be mounted on said frame 4 so as to have a small oscillating movement independent of said frame—see Fig. 3. 14 is the front axle of a vehicle and 9 is the rear axle. The cylinders 1 are secured to the axles of the vehicle. Elongated slots 21 are cut in the walls of the cylinder 1 to permit the vertical travel of the pin 3 independent of the cylinder 1. Springs 7 (which bear against the outside ends of the bearings 18), are mounted on the shaft 3 and the tension on said springs is regulated by the nuts 8. The pin 3 has a sliding horizontal movement in the bearings 18, (as well as an oscillating movement), independent of the frame 4. Said movement is limited and cushioned by the springs 7.

12 is a chamber between the lower ends of the piston 2 and cylinder 1. Said chamber 12 is supplied with compressed air at any desired pressure.

11 is a leather packing ring secured to the piston 2 by the plate 10.

16 is a spring interposed between the head 5 and the upper end of the piston 2, for the purpose of cushioning the upward movement of said piston 2. 33 is a rubber bumper to limit the downward movement of the piston 2.

15 is a flexible hose which connects the chamber 12 to the source of compressed air supply. Said air may be furnished by any desired means. Where the motive power of the vehicle is a gas engine, air may be supplied to the tank 29 from the explosion chamber 23 of the engine cylinder 22 through the connection 28. A check valve 26 (carried by the member 25), is arranged in the connection between the explosion chamber 23 and tank 29, to permit compressed air or gas to pass from said chamber 23 to the tank 29 until the pressure in said tank 29 has reached the pressure obtained in the chamber 23.

6 is a shaft (see Fig. 3), connecting the bearing supports 18.

32 is a bushing fixed to the frame 4, which carries the shaft 6 and allows a small oscillating movement of said shaft 6 independent of the frame 4. Said oscillating movement of said shaft 6 may be limited by means of securing the piece 31 (see Fig. 4), to said shaft 6 and fixing to the piece 31 the flat spring 30 which bears at either end on the frame 4.

20 indicates the vehicle wheels.

19 indicates dust covers to prevent dirt from entering cylinder 1 through the slots 21. 24 indicates the piston of a gasolene engine, and 27 indicates the opening from the explosion chamber 23 to the check valve 26. Oil may be supplied to the cylinder and piston in any desired manner, for the purpose of lubricating same.

From the above description it will be plainly seen that the vehicle frame is supported and cushioned by compressed air; that the upward movement of said frame is also cushioned; that said frame, (and parts carried thereby), is cushioned in a horizontal direction and has a horizontal movement independent of the vehicle axles. That the cylinders 1 are permitted to oscillate independent of said frame, when bumps on the road are encountered; further that by allowing the bearing supports 18 to have a small oscillating movement independent of the frame 4 (see Fig. 3), the pistons 2 will always be in proper alinement with the cylinders 1, regardless of the difference in the amount of weight on the front and rear axle. For example the rear seat of the vehicle might be designed to accommodate five passengers, which would represent a weight of say 750 pounds. There would be times when this rear compartment would be free from passengers. Unless some means is provided to permit the oscillating movement of the bearings 18, the pistons 2 would bind in the cylinders 1 when the load on the frame would be unevenly divided.

What I claim is:

1. The combination with a vehicle frame, of an axle, a cylinder attached to one of said parts, a bearing attached to the other of said parts, a piston moving in said cylinder, a rod carried by said piston and having movement in said bearing substantially at right angles to the movement of said piston, and a spring tending to hold said rod and bearing against relative movement.

2. The combination with a vehicle frame, of an axle, a cylinder attached to one of said parts, a bearing attached to the other of said parts, a piston moving in said cylinder, a horizontally extending rod carried by said piston and having longitudinal movement in said bearing, and a spring tending to hold said rod and bearing against relative movement.

3. The combination with a vehicle frame, of an axle, a cylinder carried by one of said parts, a pair of bearings carried by the other of said parts, a piston in said cylinder, a rod carried by said piston and extending through slots in the cylinder, said rod being longitudinally movable in said bearings, and a pair of springs arranged on said rod one at each side of said cylinder.

4. The combination with a vehicle frame, of an axle, a cylinder carried by one of said parts, a pair of bearings carried by the other of said parts, a piston in said cylinder, a horizontally extending rod carried by said piston and projecting through slots in the cylinder, said rod being longitudinally movable in said bearings, and a pair of springs arranged on said rod one at each side of said cylinder.

5. The combination with a vehicle frame, of an axle, a cylinder provided with slots and secured to one of said parts, a pair of bearings carried by the other of said parts, a piston in said cylinder, a pin carried by said piston and extending through said slots, said pin having longitudinal movement in said bearings, and a dust guard carried by said pin and covering said slots.

6. The combination with a vehicle frame, of an axle, a cylinder carried by one of said parts, a pair of bearings mounted to oscillate on the other of said parts, a pin carried by said piston and movable longitudinally in said bearings, and a spring tending to prevent relative movement between said pin and bearings.

7. The combination with a vehicle frame, of an axle, a cylinder carried by one of said parts, a rock shaft carried by the other of said parts, a pair of bearings carried by said rock shaft, a piston in said cylinder, a pin carried by said piston and movable longitudinally in said bearings, and a spring tending to prevent relative movement between said bearings and pin.

8. The combination with a vehicle frame, of an axle, a cylinder carried by one of said parts, a rock shaft carried by the other of said parts, a pair of bearings carried by said rock shaft, a piston in said cylinder, a pin carried by said piston and movable longitudinally in said bearings, and a spring limiting the movement of said rock shaft.

LEWIS L. SCOTT.

Witnesses:
J. A. YOUNG,
W. C. ALLEN.

Copies of this patent may be obtained for five cents each, by addressing the "Commissioner of Patents, Washington, D. C."